United States Patent [19]

Morioka et al.

[11] Patent Number: 4,594,300

[45] Date of Patent: Jun. 10, 1986

[54] LEAD STORAGE BATTERY

[75] Inventors: Yuji Morioka; Sigeru Yamasita, both of Hyogo; Yoshiaki Yano, Sumoto, all of Japan

[73] Assignee: Sanyo Electric Co., Ltd., Moriguchi, Japan

[21] Appl. No.: 688,496

[22] Filed: Jan. 3, 1985

[51] Int. Cl.⁴ ............................................. H01M 4/56
[52] U.S. Cl. ....................................... 429/225; 429/233
[58] Field of Search ............................ 429/225–228, 429/66, 122, 233

[56] References Cited

U.S. PATENT DOCUMENTS 4,125,686 11/1978 Kinsman .......................... 429/152
4,207,384 6/1980 Peters et al. .................... 429/225 X
4,242,424 12/1980 Buckler et al. ...................... 429/152
4,262,069 4/1981 Devitt et al. ......................... 429/225
4,383,011 5/1983 McClelland et al. ........... 429/225 X Primary Examiner—Charles F. LeFevour
Attorney, Agent, or Firm—Wenderoth, Lind & Ponack

[57] ABSTRACT

A lead storage battery having electro-collecting boards of lead or lead alloys, and active material layers closely contacted with the electro-collecting boards. The active material layers are integrally formed with the electro-collecting boards by providing a mixture, in the form of slurry, of an active material powder and a liquid to the electro-collecting boards, and then drying the mixture.

2 Claims, 20 Drawing Figures

LEAD STORAGE BATTERY

BACKGROUND OF THE INVENTION

The present invention relates to a lead storage battery and, more particularly to a thin and sealed typed lead storage battery wherein an electro-collecting board of lead or lead alloy is arranged within a battery casing and a cover thereof, and active material layers are formed closely adjacent to the electro-collecting boards, and the thus produced casing and cover with the plates for the anode and cathode are connected together with a separator therebetween.

In a standard lead storage battery, a lead or lead alloy supporter; which is formed by a punching, a casting or an expanding method, is coated with active materials which are mixed with lead powder or lead monoxide powder and an aqueous solution of sulfuric acid and other additives, and then subjected to curing process in a vapor atmosphere, and to a drying process to form positive and negative electrodes. The thus produced electrodes are combined with a porous separator and then inserted into the casing made of synthetic resins, and followed by a sealing step of the casing to thereby complete the lead storage battery.

The conventional lead storage battery as described has been extensively used for its reliability in quality and economic aspects. Along with the recent miniaturization of devices and instruments in various fields, the miniaturization of batteries, such as lead storage batteries, for power sources of such devices and instruments is of interest and is sought after enthusiastically. In order to comply with the requirement of the industry, an attempt has been made to use a synthetic net as a supporter in place of the conventional metal in the form of a lattice and a lead plate or lead alloy plate was used for an electrocollecting board so that pastelike active materials are disposed to the synthetic resin net to form electrodes. The thus formed electrodes are cut to a predetermined size and then closely contacted to the collector to thereby complete a thin and light-weighed lead storage battery.

However, the lead storage battery in accordance with the above-mentioned attempt reveals some difficulties, which will be described hereinafter. The aforesaid electrodes attempt in producing is basically common to that of the conventional method, and more specifically, it is necessary that paste-like active materials be prepared and then provided onto the supporter for the synthetic resin net. Therefore, during the process of forming the active material, a noxious powder such as a lead powder is apt to be scattered in the air, resulting in an extreme deterioration of the active material. Further, it is difficult to make the density of the paste-like active material constant resulting in a scattering in the capacity of the electrodes. Particularly, since the quantity of the applied paste-like active material is limited in the thin-type battery, non-uniformity of the battery characteristics becomes much more serious in accordance with the uniformity of the electrodes in respect to the capacity thereof. Besides, in the production of the lead storage battery, troublesome assemblies and steps are necessary such as the preparation of paste-like active materials, coating of the active materials on the supporter, cutting it to a predetermined size, and assembling it to make it closely contacted with the electr-collecting board.

In addition, such a thin-type lead storage battery, which is to be mounted within a device or an instrument, must be sealed, as described in Japanese Patent Publication No. 50-12092 or Japanese Unexamined Patent publication No. 57-176667. The basic structure thereof will be explained with reference to FIG. 1 of the drawings. In FIG. 1, reference numerals 1 and 2 represent a battery casing of a synthetic resin and a battery cover 2 of a synthetic resin, respectively. Within the space 3 confined by the casing 1 and the cover 2, a negative electrode 4 and a positive electrode 5 are positioned through a separator 6. In such a thin-type storage battery, the conventional method wherein an electrolyte is supplied through a small hole of the casing after the cover and the casing are adhered together is not applicable for miniaturizing the batteries and producing them in quantity. Thus, a method has been used in which the casing and cover are subject to ultrasonic welding after the electrolyte is secured by the electrodes 4, 5 and the separator 6. The battery has an outlet valve 7 on the inner wall of the casing, an outlet port 8, and a valve seat 9, as illustrated.

However, the method by ultrasonic welding have revealed other difficulties. Namely, in the welding step of the casing and cover, the active materials positioned adjacent to the positive and negative electrodes 4, 5 are scattered due to vibration, and the scattered active material around the electrodes induces a short circuit of the positive and negative electrode. Similarly, the scattered active material is exhausted together with the electrode out of the casing 1 through the outlet port 8, and at this moment the scattered material is stuck to the position between the outlet valve 7 and the valve seat 9, resulting in a failure of the sealing at this part of the battery. In order to avoid such a short circuit, a separator having a larger areas than the electrodes is used to provide an electrical separation between the electrodes. Further, a sufficient space 10 is formed between the electrodes and the outlet port 8 so that a longer passage is formed between these elements in order to minimize the quantity of the active material which is exhausted through the outlet port 8 and to minimize the sticking of the active material to the valve seat 9. However, the provision of the relative large space 10 and larger separator reduces a volume efficiency of the battery and results in a failure of miniaturization.

A mechanism for permitting a gas, which is generated by an electrochemical reaction within the lead storage battery, to be exhausted by means of a safety valve or gas exhaustion hole is known in, for example, Japanese Utility Model Publication Nos. 40-31878, and 40-31879 and Japanese Unexamined Utility Model Publication No. 58-155763. In Japanese Utility Model Pub. No. 40-31878, as illustrated in FIGS. 2A-2C, the casing 11 has at its upper portion a cylindrical projection 12, an aperture 13 communicated with the interior of the casing, and a rubber tube 14 fitted to the cylindrical projection to close or plug the aperture 13. A cover (not shown) prevents the rubber tube 14 from being dislocated from the cylindrical projection, wherein the cover has an aperture (not shown). In Japanese Utility Model Pub. No. 40-31878, as illustrated in FIGS. 3A-3C, a cylindrical projection 16 with an opening 17 is formed on top of the casing 15 and a rubber cap 18 is adapted to the projection to close the opening 17. The cap is held by a cover (not shown) so that it is not removed or dislocated, wherein the cover has an aperture (not shown). In Japanese Unexamined Utility Model Publication No. 58-155763 a casing is formed with a pair of synthetic resin members and a frame interposed therebetween, and a safety valve port is provided for communication between the interior and outside of the casing.

However, the above-mentioned structure reveals the serious problems as described hereinafter. In the battery structure of Japanese Utility Model Pub. No. 40-31878, if it is applied to a thin-type lead storage battery, the cylindrical projection 10 must be formed on the side portion of the casing 9 so as to minimize the thickness of the casing, as shown in FIG. 4. Such a casing 9 with a cylindrical projection 9 is unitarily formed by molds which are moved in the direction as shown by arrows A and B (FIG. 4). The molds must have slidable rod for providing the cylindrical projection 10, and it is difficult to prepare such molds. By contrast the battery disclosed in Japanese Utility Model pub. No. 40-31879 permits a relatively easy production of the mold having a slidable rod, but is almost unapplicable to a battery which is not only small but also complex in shape since there is an inherent limitation of produceable shape and size due to working prevision of the molds, packing characteristics of resins and other factors such as shrinkage of the hardening resin. Japanese Unexamined Utility Model Pub. No. 58-155763 shows a structure in which circumferential portion of the safety valve is forcibly contacted with the frame and a pair of the resin members, and thus additional space for the valve chamber, resulting in an increase of the size in the longitudinal direction. Additionally, the safety valve must provisionally be fixed to the predetermined position within the valve chamber prior to setting of the resin members, and at this moment, the safety valve, which was provisionally press-fitted to the chamber, is displaced out of the chamber by its resilient recovery force. Thus, this structure presents difficulties in assembly operation.

In addition to the above, in the sealed type lead storage battery, a quantity of the electrolyte is generally restricted, and the concentration of the electrolyte is set to about 40 percent which is higher than that of a general storage battery for automobiles, wherein the electrolyte concentration at the time of charge is about 35 percent. The reason for the higher concentration of the electrolyte are as set forth below.

(1) Repetition of discharge to an extent that the active material is used up will shorten a life time for the battery and thus quantity of sulfuric acid in the electrolyte is restricted to restrictively determine the electrode reaction, with unused active material being maintained as it is, whereas such a problem as above is not raised with reference to the automobile battery in which charge and discharge proceed at the same time.

(2) For the purpose of obtaining higher energy density of the battery, unnecessary water is excluded as much as possible to provide higher volume efficiency and weight efficiency. Particularly, this requirement is remarkable for the thin type or small sized lead storage battery.

(3) In a sealed structure, oxygen gas generated from the positive electrode during charge is chemically consumed by the negative electrode. In such a chemical reaction, three phases (Pb for solid phase; electrolyte for liquid phase; and $O_2$ for gaseous phase) are necessary, and this chemical reaction is delayed if the quantity of the electrolyte is greater than the normal. Therefore, the electrolyte is restricted in its quantity.

By the reasons described above, in the sealed type lead storage battery, the electrolyte thereof is set to have the highest concentration which is close to the upper limit of the allowed concentration for the lead storage batteries.

In the conventional sealed-type lead storage battery, the casing and the cover are made of ABS resins from the viewpoints of mechanical strength, dimensional stability, surface appearance, ecconomical aspects, etc. However, such resins as ABS resins has a vapored water permeable property, and water in the electrolyte is vapored to penetrate the casing wall or cover wall to lead out of the battery. Consequently, the concentration of the electrolyte becomes higher than the aforementioned limitation, and such a high concentration of the electrolyte accelerates the corrosion speed of the electrodes plates resulting in the deterioration of the electrode plate capacity and the life of the battery. Up to the present, no specific countermeasure has been successfully made to alleviate the exceedingly high concentration of the electrolyte due to the abovementioned phenomena, presumably because the property level of the conventional batteries is rather low. Although an attempt was made to use a resin having a relatively low vapored water permeability such as a high-impact polystyrene, the above-mentioned problems have not yet been solved successfully.

SUMMARY OF THE INVENTION

An object of the present invention is to provide a sealed type lead storage battery which permits a simple manufacturing step, an improvement in the working circumstances in respect to the deterioration of the battery as a result of the noxious or toxic powder. Also, an object of the present invention is to improve the reliability of the storage battery capacity.

Another object of the present invention is to provide an improved sealed type lead storage battery which can be maufactured by relatively simple production facilities.

Another object of the present invention is to provide a sealed type lead storage battery, which can prevent the active material from being scattered around the electrode plates when the battery casing and cover are welded together.

A further object of the present invention is to provide a new sealed type lead storage battery which permits one to produce of a safety valve mechanism provided to a battery casing or a of a simple structure, and which can decrease the occupied volume of the valve mechanism in accordance with the miniaturization or thinning of the battery.

An additional object of the present invention is to provide an improved sealed type lead storage battery which can prevent a concentration of the electrolyte from becoming excessively higher, and which provides improved properties and life time.

According to the present invention, there is provided a lead storage battery in which an electro-collecting board made of lead or lead alloy is positioned in a casing and electrode plates are formed in a close contact with the collector. In the invention, a slurry-like mixture of an active material powder and liquid is applied to a surface of the electro-collecting board, and then dried to form a unitary structure of the electrode plates of the active material and the electro-collecting board. This structure is effective for decreasing the irregularity of the electrode plate capacity and for a desired production process without substantial labor and difficulty. In the invention, the mixture of an active material powder and a liquid such as an aqueous solution of sulfuric acid is prepared in the state of slurry which has a stronger Newtronian flow characteristic than when it is in the state of paste. This means that time and energy required for the mixture of a liquid and an active material powder are decreased. Further, a much simpler mixing device or tools such as a vessel with an agitator can desirably mix the liquid and the active material powder, without using a large-scaled and complex mixer such as a Banbury mixer or a kneader having a plurality of agitators. It is difficult to reliably control the density of the active material if it is in the state of paste since the density is largely dominated by air contained in the paste, and therefore it is necessary to conduct a measurement every time it is regulated. By contrast, a mixture in the form of slurry reveals a constant density of the mixture because the slurry does not substantially contain air and because the true density of the powder is unchanged even when apparent density thereof is changed in accordance with a production lot. The same is true of various factors which dominate the working properties, such as, for example, the viscosity and the volume change of the mixture which contains an active material powder. By preparing the mixture in the form of a slurry, displacement or transportation and measurement of the volume of the mixture can be achieved readily. Apparently, this is based upon the difference in the solid state properties between the paste and the slurry. Such an effective form of slurry as described above can be realized successfully by simply controlling the mixing ratio of the liquid and the powder, or in other words, by increasing the quantity of the liquid.

In the present invention, a electro-collecting board is placed horizontarily and then a fixed volume of the mixture in the form of slurry is supplied to form a rectangular mixture layer on the electro-collecting board, utilizing the solid state properties of the Newtonian fluid of the slurry. Thereafter the mixture is dried to complete the electrodes. By forming the electrode plates on the electro-collecting board as described above, the following advantages are expected.

Firstly, a manufacturing step or stage which causes an active material powder to be scattered in the air is not necessary at all, and any consideration or anxiety in regard to the working circumstances is not required. Secondly, the formed electrode plates can be used by 100% thereof without a material loss which is inherent in the conventional steps such as the cutting step. Thirdly, the volume of the liquid can be measured almost ten times as precisely as that of the conventional method in which the volume is measured by controlling the thickness, width and length to obtain a predetermined electrode plate capacity. This means that the active material in the battery can be controlled quite precisely, therefore no anxiety is necessary for providing the balanced capacity between the positive electrode and the negative electrode and the process described above provides advantages in both cost and quality. Besides, there is an advantage in that formation of the electrode plate and attachment of it to the electrocollecting board can be performed simultaneously.

In a preferred embodiment of the invention, projections are formed in an opposed relation at the peripheral portion of the battery casing or the cover so that the projections hold the separator under pressure. This structure can prevent the active material from being scattered from the electrode plate at the time of ultrasonically welding the casing and the cover and then exhausted out the battery.

In a further embodiment of the invention, a safety valve chamber is formed between the casting and the cover, and an outlet port which is communicated with the interior of the casing is opened at the inner wall of the casing. The casing has a gas exhaustion hole. Within the safety valve chamber is disposed a resilient, tubular safety valve which is located such that its ends are contacted with the casing and the cover.

In a further embodiment of the invention, the casing and the cover are made of a synthetic resin which has a filler of a low water vapor permeability. It is generally known that a filler is added to a resin so as to improve the solid state properties of the resin. However, no specific counter-measure has been found for improvement of the water vapor permeability by addition of a filler. The inventors of the present invention have found by various experiments that the resin, if mixed with a special filler, reveals an improved water vapor permeability. This filler itself hardly has a water vapor permeability if it is solely used, such as a flat shaped material, for example, a micrograss flake (CCF-048) developed by Nippon Garasu Co., Ltd. a corporation of Japan. In principle, since the fillers are of flat shape, the flat surfaces of the fillers are aligned in a continuous manner in accordance with a flow of the resin in the molding step, and a substantially unitary layer of the filler is formed. The filler covers the substantial surface of the casing and the cover, and prevents a transmission of water vapor through the casing and the cover since the filler has an extremely low permeability to water vapor.

BRIEF DESCRIPTION OF THE DRAWING

FIGS. 1 through 4 show a prior art structure, wherein FIG. 1 is a sectional view of a conventional sealed type lead storage battery, FIG. 4 is a perspective view of a battery casing which has a safety valve mechanism as shown in FIGS. 2A through FIGS. 3C.

DETAILED DESCRIPTION OF REFERRED EMBODIMENTS

Embodiment 1

A preferred embodiment of the invention will be described with reference to FIGS. 5 and FIG. 6 and FIGS. 7A to 7C. 75 weight part of lead monoxide powder, 25 weight part of trilead tetraoxide, 0.2 weight part of hydroxypropylcellulose (a thickening agent having a higher viscosity than polyethyleneoxide : HPC), and 24 weight part of water are mixed by an agitator for about 5 minutes to obtain a mixture in the form of slurry. By making the mixture in the form of slurry, the mixing time can be decreased to 1/6 relative to that of a mixture in the form of paste which generally contains water of about 10 part by weight and must be treated by a high-power mixer for about 30 minutes. The density of the mixture in the form of slurry is about 3.3 g/cc, whereas the conventional paste mixture generally has a density of about 4.4 g/cc.

Figure 1:
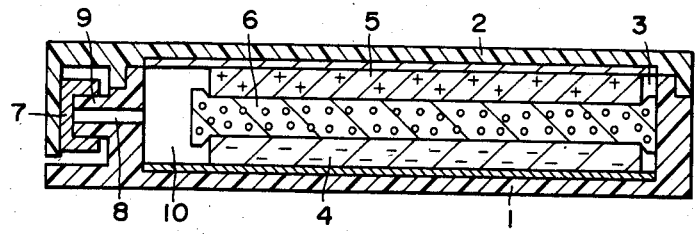
Figure 2A:
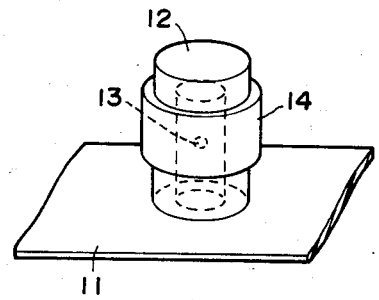
FIGS. 2A to 2C and FIGS. 3A to 3C show safety storage battery.
Figure 2B:
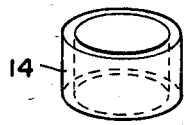
Figure 2C:
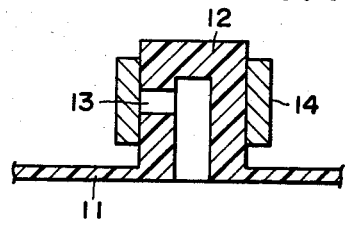
Figure 3A:
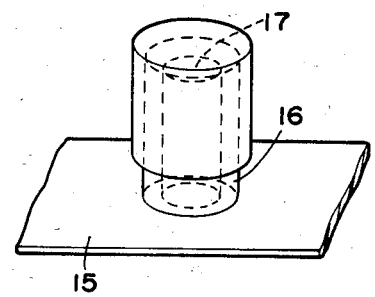
Figure 3B:
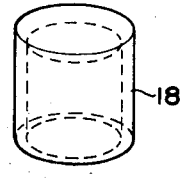
Figure 3C:
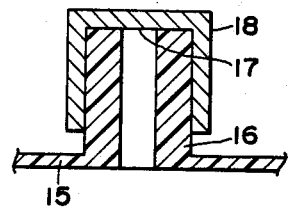
Figure 4:
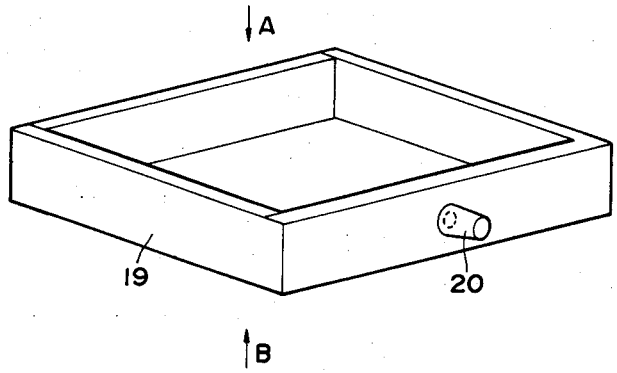
Figure 5:
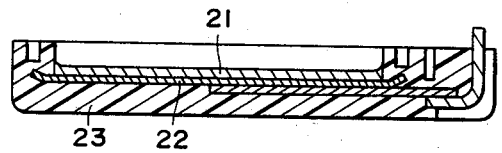
FIG. 5 is sectional view of a battery casing embodying the present invention.

The mixture in the form of slurry is supplied into a battery casing 23 which is made of a synthetic resin and is provided unitarily with an electro-collecting board 22, as illustrated in FIG. 5 and subject to drying to thereby form an electrode plate 21 on the collector 22. When the slurry is supplied, it flows on the surface of the electro-collecting board 22 and is diffused into a rectangular shape. This diffusion is facilitated if the casing 23 is vibrated slightly so that the rectangular shape of the slurry can be obtained in a shorter time. Lead weight (lead density) per a unit volume of the electrode plate at the time when the drying step is completed was 4.2g/cc, which is substantially equal to that of the conventional electrode which was made from the mixture in the form of paste. This is supposedly based upon the fact that the lead compound powder in the fact that the slurry mixture is spontaneously settled down in the drying step with the result that the density thereof is substantially equal to that of the mixture in the form of paste as used in the conventional process.

A density of active material is readily controlled by simply adding a small amount of sulfuric acid to the mixture in the form of slurry.

The foregoing is the explanation of forming the positive electrode, and the negative electrode can be manufactured in a substantially similar manner by selecting materials such as the active material and thickener and compounding ratio thereof, and utilizing the cover of the battery casing 23.

The thus produced casing for the positive electrode and the cover for negative electrode are fitted together, and an electrolyte is supplied, and thereafter the casing and the cover are welded by an ultrasonic welding method to completely seal the casing. Thus, a sealed, thin type lead storage battery can be made.

Figure 6:
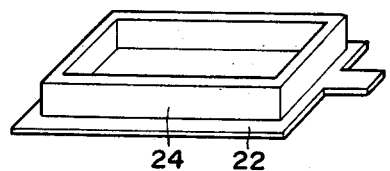
FIG. 6 shows a modified process for forming electrode plates for the battery of the embodiment of FIG. 5.

Alternatively, as illustrated in FIG. 6, a frame 24 which has an area for a unit electrode plate is prepared and located on the electro-collecting plate 22, and then the mixture in the form of slurry is supplied into the frame 24. After the slurry is dried, the frame 24 is removed to form a unitary structure of the electro-collecting board and the electrode plate 21. This unitary structure can be integrally formed in the casing 23 by an insert molding.

Figure 7A:
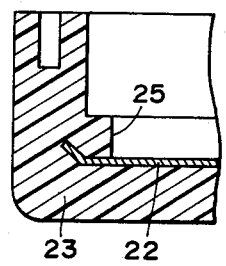
FIGS. 7A and 7B are sectional views showing the state before a mixture in the form of slurry is supplied and the state after mixture is supplied, respectively, wherein a shoulder is formed in the casing.
Figure 7B:
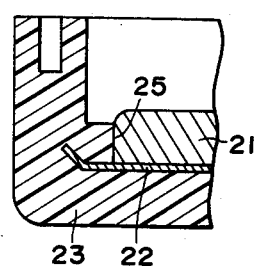
Figure 7C:
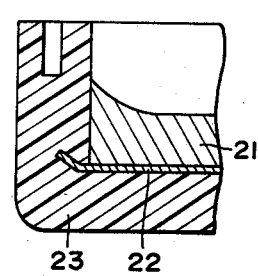
FIG. 7C is a sectional view showing that the mixture is supplied wherein no shoulder is provided.

As illustrated in FIG. 7A, a shoulder 25 can be formed at the position where the electro-collecting board 22 is enclosed by the casing wall, so that the boundary surface of the mixture in the form of slurry becomes more distinct as illustrated in FIG. 7B than the structure of FIG. 7C wherein no shoulder is formed. Thus, the shoulder 25 is effective for obtaining electrode plates 21 of a constant thickness.

As described above, the mixture in the form of a slurry of the active material powder and the liquid is supplied to form a unitary structure of the electro-collecting board and the electrode plate of the active material. Accordingly, the process of forming the mixture and the assembly of the electrode plate can be greately simplified, and therefore the facilities can be simplified. Further, a step for cutting into a unit electrode plate is not required at all, and thus any devices and instruments for the cutting process is unnecessary. Besides, the production time according to the invention can be decreased to about 80 percent relative to the time consumed by the conventional process which uses the mixture in the form of paste. In the present invention, preparation of the mixture in the form of slurry can be conducted within a sealed container, and there is no need to take care of working circumstances. In addition the, uniformity or variability in weight of the electrode plate can be greately improved to the value of ±0.7%, whereas the conventional process using the paste-like mixture had a value of ±6.5%.

EMBODIMENT 2

Figure 8:
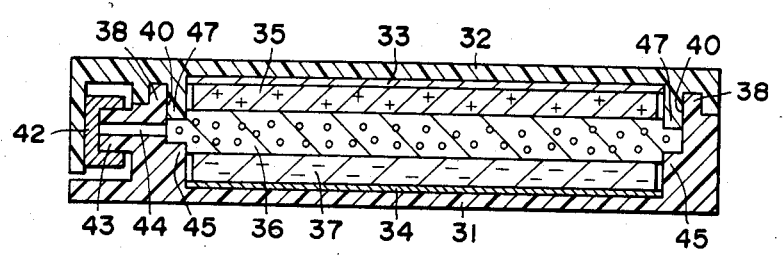
FIG. 8 is a sectional view of the battery according to another (second) embodiment of the invention.

FIG. 8 shows another embodiment of the present invention, wherein reference numerals 31 and 32 are a casings of synthetic resins such as an ABS resin or AS resin, and a cover of similar synthetic resins, respectively. Within the interior space confirmed by the casing 31 and the cover 32, an positive electrode plate 35, a separator 36 and a negative electrode plate 37 are interposed between electro-collecting board 33 for positive electrode and a electro-collecting board 34 for negative electrode, in a stratified configuration. The positive electrode plate 35 and the negative electrode plate 37 are formed by supplying the mixture in the form of slurry of the active material powder onto the electro-collecting board 33, 34 to form a layer of a constant thickness, and drying the layer. The separator 36 is made of a suitable glass fiber to form a porous structure having a larger area than the positive and negative electrode plates 35, 36, and an aqueous solution of sulfuric acid is impregnated thereto as an electrolyte. The casing 31 has a projection 38 at its circumferential portions and the cover 32 has a recess 40 for snugly receiving the projection 38 of the casing 31. The casing 31 has a valve seat 43 at its one end, and a safety valve 42 is fitted to the valve seat to generally close a gas exhaustion hole 44 formed in the casing 31 but function to permit the gas to flow out of the battery when a gas pressure within the casing 31 is elevated up to a predetermined value through the hole 44.

The casing 31 in this embodiment has a shoulder 45 and the cover 32 has a shoulder 47 in an opposed or confronting relation as illustrated in FIG. 8 so that the separator is forcibly secured from opposed sides by the shoulders 45 and 47. Thus, the interior of the battery which is confined by the casing 31 and the cover 32 is fully shielded from the outside.

After the positive electrode plate 35 and the negative electrode plate 37 are formed on the elecrtro-collecting board 33, 34 as described, the separator 36 is arranged between the positive and negative electrode plantes 35, 37 and the electrolyte is supplied into the separator 36. Thereafter, the safety valve is fitted to the valve seat of the casing 31, and the cover is attached to the casing and then welded together by an ultrasonic welding apparatus to complete a lead storage battery of the invention. Since the entire circumference of the separator is firmly held by the opposed shoulders 45, 47 in the welding process, the active material powder, which may appear on the surface of the plates 35, 37 during the ultrasonic welding, is obstructed from flowing towards the gas exhaustion hole 44. However, it will be anticipated from the foregoing description that the gas generated within the casing and the electrolyte are movable, and therefore the structure as well as the process for making the battery as described above does not affect at all to the battery properties.

The provision of the shoulders 45, 47 in a confronting relation provides an effective function for preventing the active material powder, which may be scattered during the welding step, from being scattered into the plate of opposite polarity. Therefore, the property deteriorations and short circuits due to such an undesirable flow of the powder can be avoided. Further, in the battery of the type having a gas exhaustion hole, the powder, if produced during welding, does not stick to the portions around the gas exhaustion hole. Additionally, no additional space is required in the battery structure of the present invention, and a volume efficiency of the battery can be improved.

EMBODIMENT 3

Figure 9:
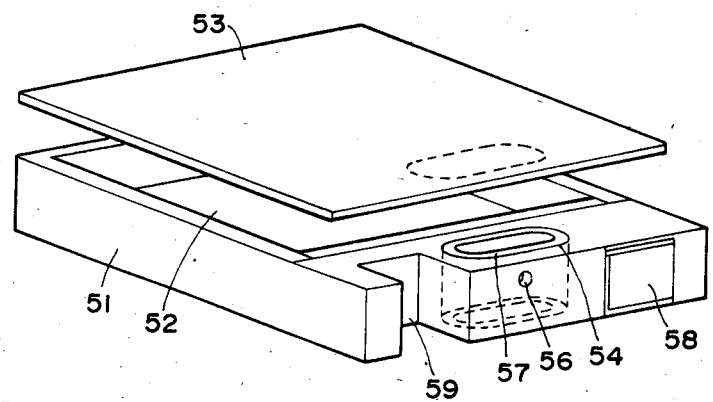
FIG. 9 is a fragmentary perspective view of the battery according to another (third) embodiment of the invention.
Figure 10:
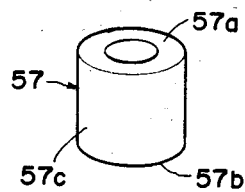
FIG. 10 is a perspective view of a safety valve used for the battery shown in FIG. 9.
Figure 11:
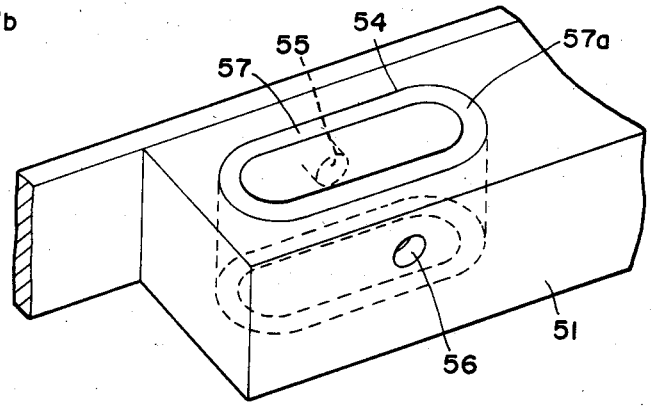
FIG. 11 is an enlarged perspective view of a part of the battery illustrated in FIG. 9.
Figure 12:
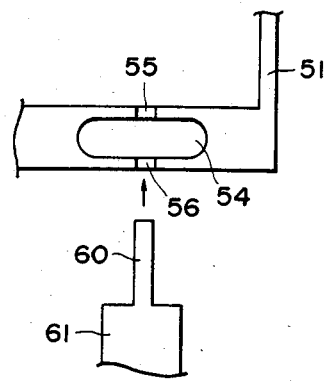
FIG. 12 is a plan view showing a step of forming a gas exhaustion hole in the battery shown in FIG. 9.

FIGS. 9 to 12 show a further embodiment of the present invention, wherein reference numeral 51 represents a casing of high-impact polystyrene which has a space 52 for containing therein, though not shown, a pair of electrocollecting board of lead or lead alloys, electrode plates of an active material fitted to the electro-collecting boards, a glass fiber separator interposed between the electrode plates and electrolyte impregnated in the separator. A cover 53 which is made of the same material as that of the casing 51 is fixed to the casing 51 by an ultrasonic welding apparatus. The casing 51 has an oval chamber 54 for securing a safety valve (not shown) a gas exhaustion hole 55 which connects the chamber 54 and the space 52 of the casing 51, and a gas hole 56 open to the outside of the battery. Reference numeral 57 is a tubular safety valve made of a suitable resilient material, which has ends 57a, 57b and a circumferential outer surface 57c as shown in FIG. 10. The safety valve 57 is forcibly secured in position within the chamber 54 such that the ends 57a, 57b contact the base of the chamber 54 and the inner wall of the cover 53, respectively, against a resilient force of the valve 57 itself. Thus, the valve 57 which is round shaped in cross section as shown in FIG. 10 is deformed into an oval shape and then closely and forcibly contacted with the substantially entire circumferential surface, or inner wall, of the chamber 54 by a recovery force of the valve material. Thus, the tubular safety valve 57 is provisionally fixed within the chamber 54 until the cover 53 is fixed to the casing 51. In FIG. 9 of the drawing, reference numeral 58 and 59 represent a terminal which is connected to the components in the space 52 of the casing, and a port for receiving the other terminal (not shown).

The gas exhaustion hole 55 and the gas hole 56 can be formed relatively simply by utilizing a mold 61 having a rod 60 such that the rod 60 is inserted into an aperture (not shown) of an upper mold for forming the chamber 54, and then supplying the predetermined resin thereto. It is preferred that the safety valve have a circumferential length substantially equal to, or slightly larger than, the circumferential wall length of the chamber 54, but a valve having a slightly smaller circumferential length than the chamber may be applied. It will be anticipated that the shape of the chamber can be modified to a rectangular shape, for example, instead of the oval shape.

Embodiment 4

A further embodiment of the present invention will be described with reference to FIGS. 13, and 14, wherein a casing 61 has a space 62 for containing therein the battery components such as electro-collecting boards, electrode plates of the active material, a separator and electrolyte, as similar as the previous embodiment of FIGS. 9-12, and a similarly formed cover 63 is ultrasonicwelded to the casing 61. The casing 61 has an oval or elliptical chamber 64 for securing therein a safety valve 57 (FIG. 10). Similar to the previous embodiment of FIGS. 9-12, the safety valve 57 is provisionally fixed until the cover 63 is fixed to the casing 61. The cover 63 has a tab 70 and the casing 61 has a recess 67 at the valve chamber 64 for receiving the tab 70 when the cover 63 is fixed to the casing 61. Further, the cover has a protrusion 71 which is to be engaged with the terminal port 69. It is to be noted that a slight space is formed between the tab 70 and the recess 67 for functioning a gas exhaustion. The gas exhaustion hole 65 can be simply formed by utilizing a mold 73 having a rod 72, as similar as previously described with reference to FIG. 12. In this embodiment of FIG. 13 the tab 70 extending downwardly functions as a safety valve, and it is modified, if desired, to other forms such as a tubular shape as the embodiment of FIGS. 9-12.

In the embodiments of FIGS. 9 through 12 a gas exhaustion hole is formed at the portion of the valve chamber (54, 64) and a tubular safety valve of a resilient material is provided in the chamber such that the ends of the valve are contacted with the casing and the cover. Thus it is possible to make it smaller the safety valve mechanism without substantial difficulty or labor. Further, this structure permits a thinner structure of the battery since the valve is secured in contact with the casing and cover, and if necessary the valve chamber can be made larger in the longitudinal direction thereof without sacrificing the requirement of thinner structure. Additionally, the safety valve in the form of a tube can be obtained readiy and reliably.

Figure 14:
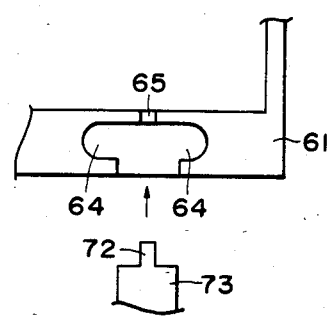
FIG. 14 shows a step for forming a gas exhaustion hole for the battery shown in FIG. 13.
Figure 13:
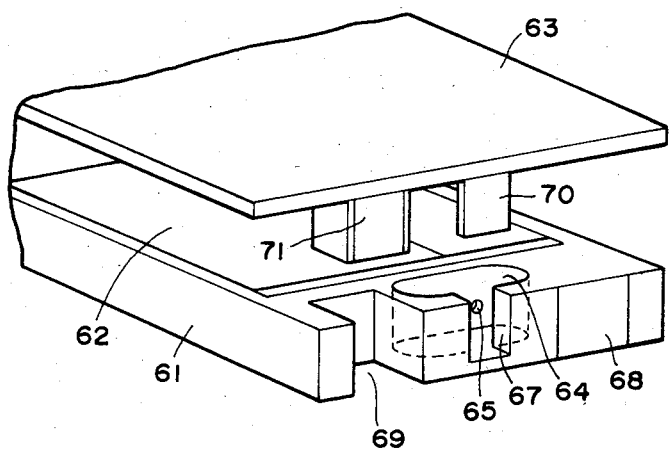
FIG. 13 is a fragmentary perspective view of the battery according to another (fourth) embodiment of the invention.

In the structure of the embodiment of FIGS. 13 and 14 wherein the gas exhaustion is effected by a slight gap formed between the casing and the cover, an appearance of the battery is not deteriorated since there is no need for providing a hole on the outer surface of the battery. Further, the safety valve in the form of a tab 70 is snugly fitted to the recess of the casing so that its provisional engagement is made stable. Additionally, a shorter rod 72 of the mold 73 can form a single hole, which is the gas exhaustion hole 65, and there is little danger of injury or breaking of a long rod.

EXAMPLE 1

An ABS resin or high-impact polystyrene is homogeneously mixed with flat glass flakes of about 20% by volume, wherein the flat glass flakes having a thickness of about 3 microns and particle size of several hundred microns, and the mixture is heated to 60° C. within an isothermal vessel for 4 hours, and heated up to a resin temperature of 250° C. for injection molding of a casing. A predetermined volume of water is supplied into the casing in correspondence with the volume of a practical use, and subject to ultrasonic welding to provide a complete sealing. The thus prepared casing was left to stand in the atmosphere of 40° C. for 4 days and its weight change was measured, as set forth in Table 1 below.

In Table 1, GFI represents glass fibers and GFL glass flakes.

The weight loss ratio (%) is calculated by the following formula.

TABLE 1

| Fillers | Resin | | | | | | |
|---|---|---|---|---|---|---|---|
| | ABS resin | | | | High impact styrene | | |
| | | GFI | GFI & GFL | mica | | GFL | mica |
| Volume ratio of Filler | 0 | 20 | 5 ... GFL 20 ... GFL | 20 | 0 | 20 | 20 |
| Weight loss ratio (%) | 100 | 100 | 24 | 24 | 59 | 14.7 | 18 |

EXAMPLE 2

Glass flakes of 20% by volume and glass fibers of 5% by volume are homogeneously mixed with ABS resin, and subject to a heat treatment for injection molding to form a casing. A the weight loss ratio of the casing was 24% is shown in Table 1, which suggests an effective restriction of water vapor permeation. It is understood further that the shock resistance of the casing has been improved by the addition of glass fibers.

Table 2 shows the result of deterioration of the battery properties (capacity) due to a concentration of the electrolyte in response to the volume loss of the electrolyte by water vapor permeation only.

TABLE 2

| Filler | ABS resin | |
|---|---|---|
| | | GFL |
| Volume ratio of Filler | 0 | 20 |
| Time (month) until property deterioration was found. | 6 | 24 |

Note:
The products were left to stand in the atmosphere at 40° C. in the condition of a charge.

Table 2 apparently shows that a prolongation of the predetermined battery properties was achieved. Further, the filler added in the resins has proved that it can improve the heat resistance property to about 10° C. higher than that of a conventional battery casing without the filler. This is useful for an extended use of the battery under a severer condition of elevated temperature.

Although the present invention has been described with reference to the preferred embodiments, many modifications and alternations can be made within the spirit of the invention.

What is claimed is:

1. A lead storage battery comprising:
    a casing made of a plastic material;
    a cover made of a plastic material adaptable to the casing to form a battery housing;
    an electro-collecting board including lead;
    electrode plates closely contacted with said electro-collecting board, and
wherein said electrode plates are integrally formed with said electro-collecting board to form a unitary structure, and wherein said unitary structure is formed by supplying a mixture in the form of slurry of active materials and a liquid to said electro-collecting board and then dried, and wherein said electro-collecting board is integrally formed with said battery housing.

2. A lead storage battery according to claim 1, wherein said battery housing has shoulders to form a chamber for said electrode plate, and the mixture in the form of slurry is supplied to said chamber, thereby preventing the active material from being scattered around said electrode plate.

* * * * *